United States Patent
Sakemi et al.

(10) Patent No.: US 9,860,060 B2
(45) Date of Patent: Jan. 2, 2018

(54) INFORMATION PROCESSING METHOD, COMPUTER-READABLE RECORDING MEDIUM, AND INFORMATION PROCESSING APPARATUS

(71) Applicant: FUJITSU LIMITED, Kawasaki-shi, Kanagawa (JP)

(72) Inventors: Yumi Sakemi, Kawasaki (JP); Masahiko Takenaka, Kawasaki (JP); Masaya Yasuda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/969,125

(22) Filed: Dec. 15, 2015

(65) Prior Publication Data

US 2016/0204936 A1    Jul. 14, 2016

(30) Foreign Application Priority Data

Jan. 14, 2015 (JP) ................ 2015-005372

(51) Int. Cl.
*H04L 9/32* (2006.01)
*H04L 9/08* (2006.01)
(Continued)

(52) U.S. Cl.
CPC ............ *H04L 9/0869* (2013.01); *G06F 21/32* (2013.01); *H04L 9/008* (2013.01); *H04L 9/3093* (2013.01);
(Continued)

(58) Field of Classification Search
CPC ..... H04L 9/008; H04L 9/3231; H04L 9/3093; H04L 9/0869; H04L 63/0861; G06F 21/32
See application file for complete search history.

(56) References Cited

U.S. PATENT DOCUMENTS

| 6,697,947 B1 * | 2/2004 | Matyas, Jr. ........... H04L 9/3231 380/282 |
| 2009/0006855 A1 * | 1/2009 | Tuyls .................... H04L 9/3218 713/182 |

(Continued)

FOREIGN PATENT DOCUMENTS

| EP | 3038286 A1 | 6/2016 |
| JP | 2008-526080 | 7/2008 |
| JP | 2014-126865 | 7/2014 |

OTHER PUBLICATIONS

Abidin et al., Security aspects of privacy-preserving biometric authentication based on ideal lattices and ring—LWE, IEEE, 2014.*
(Continued)

*Primary Examiner* — Minh Dinh
(74) *Attorney, Agent, or Firm* — Fujitsu Patent Center

(57) ABSTRACT

A method according to an embodiment includes transforming registered data on a user, which is encrypted with an encryption algorithm that enables a calculation of a Hamming distance in an encrypted state, such that a calculation result of a Hamming distance between the registered data and verification data that is encrypted with the algorithm includes a Hamming distance between the verification data and the user's registered data and a Hamming distance between the verification data and a random vector generated from the user's registered data; calculating a Hamming distance between the verification data and the registered data; and determining whether the input verification data is false based on a result of comparison of each of the Hamming distance between the verification data and the user's registered data and the Hamming distance between the verification data and the random vector included in the calculated Hamming distance with a threshold.

9 Claims, 5 Drawing Sheets

(51) Int. Cl.
*G06F 21/32* (2013.01)
*H04L 9/00* (2006.01)
*H04L 29/06* (2006.01)
*H04L 9/30* (2006.01)

(52) U.S. Cl.
CPC ........ *H04L 9/3231* (2013.01); *H04L 63/0861* (2013.01); *H04L 2209/24* (2013.01); *H04L 2209/34* (2013.01)

(56) References Cited

U.S. PATENT DOCUMENTS

| | | |
|---|---|---|
| 2010/0027784 A1 | 2/2010 | Tuyls et al. |
| 2011/0026781 A1 | 2/2011 | Osadchy et al. |
| 2013/0212645 A1* | 8/2013 | Takahashi ............. H04L 9/3231 726/3 |
| 2014/0185794 A1 | 7/2014 | Yasuda et al. |
| 2014/0281567 A1* | 9/2014 | Rane ........................ G06F 21/32 713/186 |
| 2016/0182226 A1* | 6/2016 | Yasuda ................. H04L 9/0819 380/28 |

OTHER PUBLICATIONS

Extended European Search Report dated Apr. 25, 2016 for corresponding European Patent Application No. 15200422.2, 6 pages.
Yasuda, Masaya et al.,"Packed Homomorphic Encryption Based on Ideal Lattices and Its Application to Biometrics", Springer International Publishing, Correct System Design, [Lecture Notes in Computer Science; Lect. Notes Computer] Sep. 2, 2013, pp. 55-74, XP047037853.
Yasuda, Masaya et al.,"Secure Pattern Matching using Somewhat Homomorphic Encryption", Cloud Computing Security Workshop, Nov. 8, 2013, pp. 65-76, XP058034246.
European Office Action dated Mar. 28, 2017 for corresponding European Patent Application No. 15200422.2, 6 pages.

* cited by examiner

INFORMATION PROCESSING METHOD, COMPUTER-READABLE RECORDING MEDIUM, AND INFORMATION PROCESSING APPARATUS

CROSS-REFERENCE TO RELATED APPLICATION(S)

This application is based upon and claims the benefit of priority of the prior Japanese Patent Application No. 2015-005372, filed on Jan. 14, 2015, the entire contents of which are incorporated herein by reference.

FIELD

The embodiment discussed herein is related to an information processing method, a computer-readable recording medium, and an information processing apparatus.

BACKGROUND

In recent years, with the development and growth of techniques related to computers and networks, the importance of data related to personal attributes and behaviors (personal data) and confidential data on organizations, such as companies, is increasing. Using the personal data and the confidential data through computations or analysis makes it possible to obtain unprecedented new knowledge or realize new functions, but the privacy of individuals and confidential information on organizations are at risk. Therefore, a preserving technique that enables utilization of the personal data and the confidential data in a protected (encrypted) state is attracting attention. As the preserving technique that enables utilization of data in an encrypted state, a homomorphic encryption scheme is known. The homomorphic encryption scheme is one of public-key encryption schemes using a pair of different keys in encryption and decryption, and is cryptography with a function that enables operations of data in an encrypted state.

The homomorphic encryption scheme allows operations corresponding to additions and multiplications on two or more ciphertexts, thereby enabling to obtain ciphertexts corresponding to results of calculations such as additions and multiplications performed on original plain texts without decrypting the ciphertexts. Furthermore, the homomorphic encryption scheme includes a fully homomorphic encryption scheme that allows additions and multiplications to be performed any number of times. The fully homomorphic encryption scheme allows operations, such as exclusive OR, logical AND, and negation, thereby enabling calculations by various logical circuits. However, the fully homomorphic encryption scheme needs a huge amount of time for processing, such as encryption, decryption, or secure computations, and a huge size of ciphertexts, and may be impractical in terms of performance. Therefore, a more practical somewhat homomorphic encryption scheme has been proposed.

The somewhat homomorphic encryption scheme enables secure inner-product calculations and secure distance calculations on vector data at a higher speed and a smaller size than those of schemes before improvement. Therefore, the somewhat homomorphic encryption scheme can be utilized for biometric authentication to compare pieces of data derived from biometric objects or for a tag search system to search for objects commonly present in tags from among a large number of tags.

[Patent Literature 1] Japanese Laid-open Patent Publication No. 2014-126865

However, in the homomorphic encryption scheme that enables a calculation of a Hamming distance in an encrypted state, there is a problem in that it is difficult to easily detect a spoofing attack.

Specifically, the somewhat homomorphic encryption scheme will be described as an example. First, three key generation parameters (n, q, t) are mainly prepared to generate an encryption key. n is an integer raised to the power of 2 and is called a lattice dimension, q is a prime number, and t is an integer less than the prime number q. In the flow to generate the encryption key, first, an n-dimensional polynomial $s_k$ with small coefficients is randomly generated as a secret key (the smallness of each of the coefficients is limited by a certain parameter σ). Subsequently, an n-dimensional polynomial $a_1$ with coefficients each being less than q and an n-dimensional polynomial e with extremely small coefficients are randomly generated. Then, $a_0 = -(a_1 * s_k + t * e)$ is calculated, and a set $(a_0, a_1)$ is defined as a public key $p_k$. In the calculation of the polynomial $a_0$, calculations are performed such that $x^n = -1$, $x^{n+1} = -x$, ... for a polynomial of degree n or greater to continuously calculate a polynomial of degree less than n. Furthermore, as for the coefficients of the polynomial, the coefficients are divided by the prime number q and the remainders are output. In general, a space in which the above-described calculation is performed is mathematically represented by $R_q := F_q[x]/(x^n+1)$.

Subsequently, with respect to plain text data m represented by a polynomial of degree n with coefficients each being less than t and the public key $p_k = (a_0, a_1)$, three polynomials u, f, and g of degree n with extremely small coefficients are randomly generated, and encrypted data $Enc(m, p_k) = (c_0, c_1)$ of the plain text data m is defined as follows. As for $(c_0, c_1)$, $c_0 = a_0 * u + t * g + m$ and $c_1 = a_1 * u + t * f$ are calculated. These calculations are performed by using operations in the space $R_q$.

Thereafter, with respect to two ciphertexts Enc $(m_1, p_k) = (c_0, c_1)$ and $Enc(m_2, p_k) = (d_0, d_1)$, a ciphertext addition Enc $(m_1, p_k) + Enc(m_2, p_k)$ is calculated as $(c_0+d_0, c_1+d_1)$ and a ciphertext multiplication Enc $(m_1, p_k) * Enc (m_2, p_k)$ is calculated as $(c_0*d_0, c_0*d_1+c_1*d_0, c_1*d_1)$. When the ciphertexts are multiplied as described above, it is noted that the data size of the ciphertext changes from a two-component vector to a three-component vector.

Furthermore, in a decryption process, $Dec(c, s_k) = [c_0 + c_1*s_k + c_2*s_k^2 + \ldots]_q$ mod t is calculated by using the secret key $s_k$ with respect to a ciphertext $c = (c_0, c_1, c_2, \ldots)$ (here, it is assumed that the number of components of ciphertext data increases due to encryption operations, such as a plurality of ciphertext multiplications), so that decryption is performed. Incidentally, $[f(x)]_q$ mod t with respect to a polynomial f(x) means a polynomial in which each coefficient zi in f(x) is substituted with $[zi]_q$ mod t. Furthermore, a value of $[z]_q$ with respect to an integer z is set to w when $w < q/2$ and set to w−q when $w \geq q/2$, where w is a remainder when the integer z is divided by q. Namely, the value of $[z]_q$ is in a range of $[-q/2, q/2)$. Furthermore, "a mod t" means a remainder when an integer a is divided by t.

A numerical example will be given below for ease of understanding.

Secret key $s_k = Mod(Mod(4,1033)*x^3 + Mod(4,1033)*x^2 + Mod(1,1033)*x, x^4+1)$;

Public key $p_k = (a_0, a_1)$ $a_0 = \text{Mod}(\text{Mod}(885,1033)*x^3 + \text{Mod}(519,1033)*x^2 + \text{Mod}(621,1033)*x + \text{Mod}(327,1033), x^4+1)$ $a_1 = \text{Mod}(\text{Mod}(661,1033)*x^3 + \text{Mod}(625,1033)*x^2 + \text{Mod}(861,1033)*x + \text{Mod}(311,1033), x^4+1);$ $\text{Enc}(m,pk) = (c_0, c_1);$ Ciphertext with respect to plain text data $m = 3 + 2x + 2x^2 + 2x^3$ $c_0 = \text{Mod}(\text{Mod}(822,1033)*x^3 + \text{Mod}(1016,1033)*x^2 + \text{Mod}(292,1033)*x + \text{Mod}(243,1033), x^4+1);$ and $c_1 = \text{Mod}(\text{Mod}(840,1033)*x^3 + \text{Mod}(275,1033)*x^2 + \text{Mod}(628,1033)*x + \text{Mod}(911,1033), x^4+1)$ Incidentally, in the above-described values, the key generation parameters are set such that (n, q, t) = (4, 1033, 20). Furthermore, Mod(a, q) means a remainder when the integer a is divided by the prime number q, and Mod(f(x), $x^4+1$) means a remainder polynomial when the polynomial f(x) is divided by a polynomial $x^4+1$. Moreover, it is indicated that Mod(f(x), $x^4+1$) is the same for each of a set of f(x)=$x^4$ and f(x)=−1, a set of f(x)=$x^5$ and f(x)=−x, . . . .

The above-described somewhat homomorphic encryption scheme is superior to the fully homomorphic encryption scheme in terms of the above-described performance, but when vector data (a plurality of data sequences) needs to be processed at once, a huge amount of processing time and a huge size of ciphertexts are still needed and it may be difficult to realize practically adequate performance in some cases.

To deal with a case in which the vector data needs to be processed at once, a somewhat homomorphic encryption scheme with improved performance has been proposed, in which vector data is represented by a single value by polynomial transformation and homomorphic encryption is performed on the single value to greatly improve the performance, such as a processing time and a size of ciphertexts.

In this somewhat homomorphic encryption scheme, two pieces of d-dimensional vector data $A=(a_1, a_2, \ldots, a_d)$ and $B=(b_1, b_2, \ldots, b_d)$ are used as input data. Furthermore, to calculate a distance between the two pieces of the vector data in an encrypted state at a high speed, two types of polynomial transformation such as ascending-order transformation and descending-order transformation are used.

Specifically, the ascending-order transformation and the descending-order transformation are represented as follows.

[Ascending-order transformation]$A = (a_1, a_2, \ldots, a_d)$
$\Rightarrow pm_1(A) = a_1 + a_2 x + a_3 x^2 + \ldots + a_d x^{d-1}$

[Descending-order transformation]$B = (b_1, b_2, \ldots, b_d)$
$\Rightarrow pm_2(B) = b_1 x^d + b_2 x^{d-1} + \ldots + b_d x$ When an encryption process using homomorphic encryption E is performed on the above-described A and B, results are represented as follows.

$E_1(A) = E(pm_1(A))$ $E_2(B) = E(pm_2(B))$

By using the property of the homomorphic encryption for the two ciphertexts, it is possible to calculate the inner product of the vectors A and B at a high speed through a homomorphic encryption multiplication process of $E(D) = E(pm_1(A)) \times E(pm_2(B))$. Specifically, when a decryption operator provided with a secret key decrypts a secure calculation result E(D), D obtained by the decryption is equal to a polynomial obtained by $pm_1(A) \times pm_2(B)$; therefore, the inner product $a_1 b_1 + a_2 b_2 + \ldots + a_d b_d$ of A and B can be obtained from a coefficient of a term $x_d$.

For example, if A and B are binary vectors (that is, vectors in which all of elements $a_i$ and $b_j$ is either zero or one), a Hamming distance $D_H$ between A and B can be implemented by using the above-described property in the state of being subjected to the homomorphic encryption as described below.

$E(D_H) = E_1(A) \times E_2(C) + E_1(C) \times E_2(B) - 2 * E_1(A) \times E_2(B)$ where a vector C is assumed as a vector in which all of elements is one, that is, C=(1, 1, . . . , 1).

Incidentally, the homomorphic calculation may be performed by using any of two types of homomorphic encryption schemes based on ideal lattices and ring-LWE. Furthermore, as a security requirement, if it is acceptable to allow a decryption operator provided with the secret key to know all of values of A and B, the inner product and the distance are calculated by directly using the values of A and B; therefore, a requirement, in which the decryption operator is allowed to know results of calculations using A and B but is not allowed to know the values of A and B, may be needed in some cases.

In the above-described homomorphic encryption scheme, a spoofing attack by data generally called wolf, which is data that enables spoofing with high probability with respect to an arbitrary user, is possible. In biometric authentication, biometric information includes, as an error, a difference in an environment or position in which the biometric information is read. Therefore, even for the identical person, biometric information used for registration (template) and biometric information used for authentication do not completely match with each other. Therefore, a system is configured to allow an error to some extent at the time authentication.

In the system that allows an error as described above, when biometric authentication is performed and if an error is in the acceptable range, the authentication may be successfully performed even with biometric information on other person even though the person is not the identical person (false acceptance). The wolf indicates data that intentionally cause the false acceptance phenomenon with high probability.

For example, in a biometric authentication system, if a binary vector is used as biometric information, an attacker who intends to perform spoofing uses an unexpected vector (for example, a vector other than the binary vector) as a vector for matching. By using the unexpected vector for matching, the attacker can successfully perform spoofing with the probability of ½ in the first attempt and successfully perform spoofing in at most two attempts.

A method of attack by the attacker will be described in detail below. First, a vector for registration is assumed as $A = (a_1, a_2, \ldots, a_d)$. Here, $a_i$ is either zero or one. The attacker generates a vector for attack such that $B = (b_1, b_2, \ldots, b_d) = (\alpha, 0, 0, \ldots, 0)$.

Incidentally, α is not limited to the first element but may be stored in any of the elements of B, and the other elements are zero. In the following, an example will be described in which α is stored in a first element $b_1$.

The attacker sets $\alpha = (d/2 - \theta + 1)$ in the first attempt. Here, θ is a threshold. The attacker generates $E_2(B)$ by using a public key of a user, and transmits $E_2(B)$ to a calculator who performs matching with a template. Incidentally, a binary vector is used as the biometric information in the biometric authentication system, and values of 0, 1, . . . , t−1 are acceptable as the value of $a_1$ in an encryption system; therefore, the attacker can perform an encryption process.

The calculator calculates a secure distance $E(D_H)$ by using $E_2(B)$ and $E_1(A)$ that is registered in advance. In this example, for ease of understanding of the method of attack, a coefficient of $x_d$ (a Hamming distance between A and B), which is used for final determination among coefficients in $D_H$, is focused on. Assuming that the coefficient is denoted by D, the calculation is performed by Expression below.

$$D = \Sigma a_i + \Sigma b_i - 2\Sigma a_i \times b_i$$

Furthermore, by substituting $B=(\alpha, 0, 0, \ldots, 0)$, the following is obtained.

$$D = \Sigma a_i + (d/2 - \theta + 1)(1 - 2a_1)$$

In general, a Hamming weight (the number of elements with values of 1) of the biometric information represented by the binary vector follows a binomial distribution, and the Hamming weight becomes about d/2 with extremely high probability. Therefore, assuming that $\Sigma a_i = d/2$, D is calculated as follows.

$$D = \theta - 1 \text{ when } a_1 = 1$$

$$D = d - \theta + 1 \text{ when } a_1 = 0$$

From the above expressions, when $a_1=1$, D is always smaller than the threshold, so that the attacker can successfully perform spoofing. In contrast, when $a_1=0$, it is needed to satisfy $\theta > (d+1)/2$ to obtain D smaller than the threshold.

As described above, in the biometric authentication, the system is configured to allow an error to some extent between the biometric information (template) registered in advance and the biometric information (matching data) to be read at the time of matching. However, if a threshold as a reference to allow the error is too small, a phenomenon occurs in which authentication fails even for the identical person (false rejection), and, if the threshold is large, false acceptance occurs. Therefore, as an appropriate threshold, a threshold with which these phenomena occur with the same probability is used. For example, as for IrisCode as biometric information on an iris, it has been reported that the threshold becomes 0.3 d to 0.4 d. Based on this fact, the condition of $\theta > (d+1)/2$ is not satisfied, so that spoofing fails when $a_1=1$.

When the attacker fails to perform spoofing, the attacker performs the same process as in the first attempt by setting $\alpha = -(d/2 - \theta + 1)$ as a next (second) attempt. In the second attempt, $D = \theta - 1$, which is smaller than the threshold, so that the spoofing is successfully performed. As described above, the attacker can successfully perform spoofing in at most two attempts by using the unexpected vector.

At this time, on the calculator side, because the vector for matching transmitted by the attacker as the unexpected vector is subjected to the homomorphic encryption, it is not easy to detect that the vector is false data.

SUMMARY

According to an aspect of an embodiment, an information processing method includes transforming registered data on a user, which is encrypted with an encryption algorithm that enables a calculation of a Hamming distance in an encrypted state, such that a calculation result of a Hamming distance between the registered data and verification data that is encrypted with the encryption algorithm includes a Hamming distance between the verification data and the user's registered data and a Hamming distance between the verification data and random vectors generated from the user's registered data, using a processor; calculating a Hamming distance between the verification data that is input and the transformed registered data, using the processor; and determining whether the input verification data is false based on a result of comparison of each of the Hamming distance between the verification data and the user's registered data and the Hamming distance between the verification data and random vectors generated from the registered data included in the calculated Hamming distance with a threshold set in advance, using the processor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Preferred embodiments of the present invention will be explained with reference to accompanying drawings. In the embodiments, components with the same functions are denoted by the same symbols, and the same explanation will not be repeated. The information processing method, the information processing program, and the information processing apparatus described in the embodiments below are mere examples and the embodiments are not limited thereto. Furthermore, the embodiments below may be optionally combined without causing any inconsistency.

Figure 1:
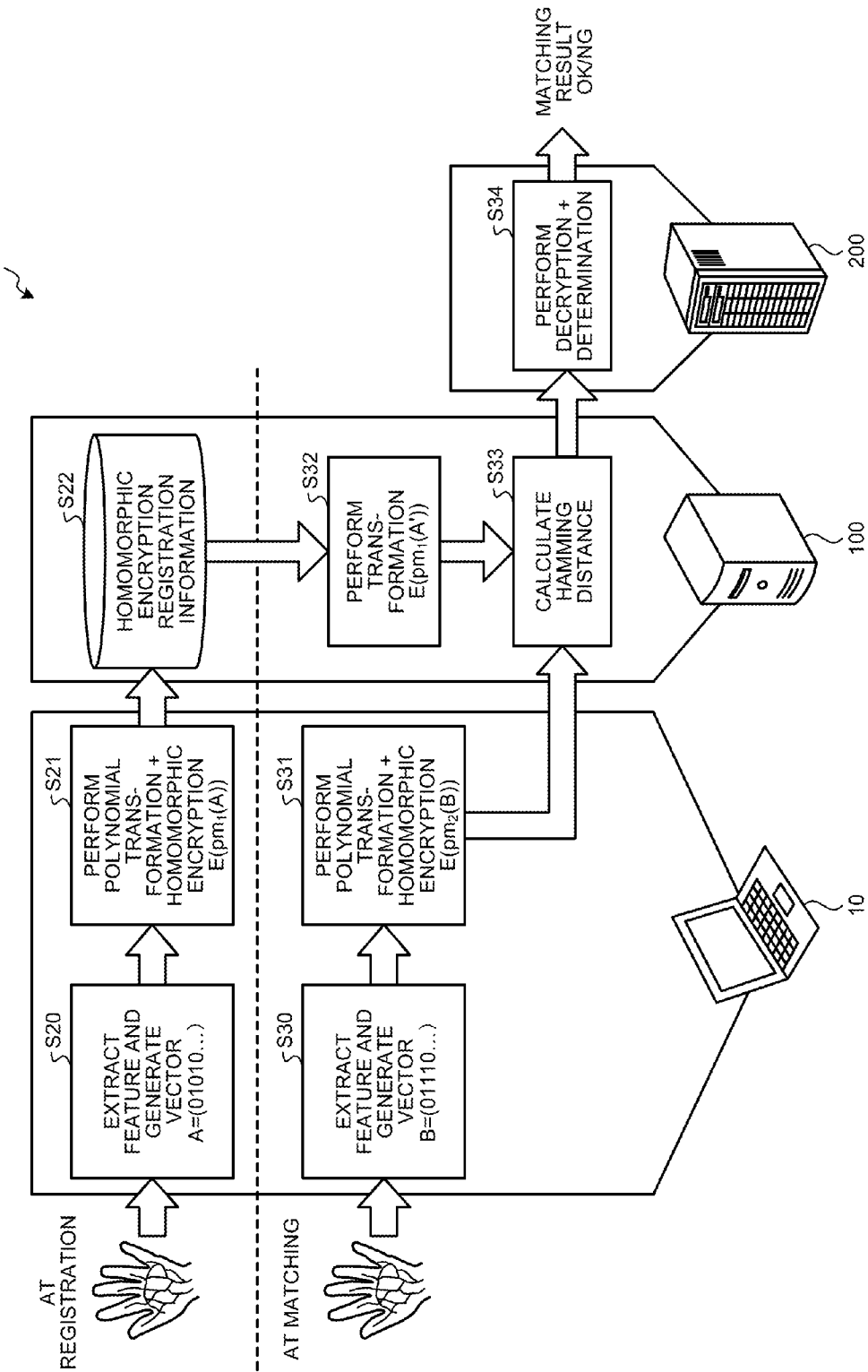
FIG. 1 is a diagram for explaining an overview of an authentication system according to an embodiment.

First, an overview of an authentication system that calculates a Hamming distance between biometric information in an encrypted state and performs biometric authentication will be described below. FIG. 1 is a diagram for explaining an overview of an authentication system 1 according to an embodiment. As illustrated in FIG. 1, the authentication system 1 includes a terminal device 10, a calculation server 100, and an authentication server 200. The terminal device 10, the calculation server 100, and the authentication server 200 are communicably connected to one another.

The terminal device 10 is a personal computer (PC), a smartphone, or the like, and is a terminal device that performs registration and matching of biometric information on a user in the authentication system 1. The terminal device 10, when performing registration and matching of biometric information, acquires biometric information on a user, encrypts the acquired biometric information by homomorphic encryption, and transmits the encrypted information to the calculation server 100. In the embodiment, an example will be described in which a vein of the hand of the user is acquired as the biometric information. However, the biometric information is not specifically limited, and may be a fingerprint or the like.

At the time of registration of the biometric information, for example, a sensor (not illustrated) of the terminal device 10 acquires the biometric information on the user, and a feature vector A is generated as feature information based on the acquired biometric information (S20). Subsequently, the terminal device 10 generates (transforms) an ascending polynomial ($pm_1(A)$) with respect to the generated feature vector A. Thereafter, the terminal device 10 performs homomorphic encryption by using an algorithm that enables a calculation of a Hamming distance (secure distance) while the generated polynomial $pm_1(A)$ is in the encrypted state, for example, by using a public key for the homomorphic encryption (S21).

Subsequently, the terminal device 10 transmits data $E(pm_1(A))$ subjected to the homomorphic encryption to the calculation server 100. The calculation server 100, upon receiving the data $E(pm_1(A))$ subjected to the homomorphic encryption from the terminal device 10, stores the data $E(pm_1(A))$ as registered data on the user in a database or the like (S22). The registered data on the user may be referred to as a template in the field of biometric authentication.

Furthermore, at the time of matching of the biometric information, the terminal device 10 generates a feature vector B as feature information based on the acquired biometric information in the same manner as in the case of the registration (S30). Subsequently, the terminal device 10 generates (transforms) a descending polynomial ($pm_2(B)$) with respect to the generated feature vector B. Thereafter, the terminal device 10 performs homomorphic encryption by using an algorithm that enables a calculation of a Hamming distance (secure distance) while the generated polynomial $pm_2(B)$ is in the encrypted state, for example, by using a public key for the homomorphic encryption (S31).

Subsequently, the terminal device 10 transmits data $E(pm_2(B))$ subjected to the homomorphic encryption to the calculation server 100. The calculation server 100 transforms the data $E(pm_1(A))$, which is stored as the registered data at the time of registration, into data $E(pm_1(A'))$ such that a calculation result of a Hamming distance includes Hamming distance between B and random vectors generated from A in addition to Hamming distance between A and B. In what follows, the Hamming distance between B and random vectors are regarded as feature vectors of other users though the random vectors are not generated from biometric information. The calculation server 100, upon receiving the data $E(pm_2(B))$ from the terminal device 10, calculates a Hamming distance between the data $E(pm_2(B))$ and the transformed data $E(pm_1(A'))$ in the encrypted state (S33). The calculation result of the Hamming distance is transmitted to the authentication server 200 that has a secret key for the homomorphic encryption.

The authentication server 200, upon receiving the calculation result of the Hamming distance from the calculation server 100, performs decryption by using the secret key for the homomorphic encryption. Subsequently, the authentication server 200 compares each of the Hamming distance between A and B, and the Hamming distance between B and other people's feature vectors among Hamming distances in plain text with a predetermined threshold. In this comparison, if the Hamming distance between A and B is equal to or greater than the threshold, the authentication server 200 outputs "NG" as a authentication result, where "NG" means that the result is reject.

Furthermore, when Hamming distance between A and B is smaller than threshold, the authentication server verifies whether B is wolf in spoofing attack. In detail, the authentication server 200 determines that the matching result is reject due to spoofing performed by wolf (S34) when Hamming distance between B and other users' biometric features (random vectors generated from A) obtained through a calculation of the Hamming distance are smaller than threshold. Only when Hamming distance between A and B is smaller than the threshold, the authentication server 200 determines that the matching result is OK. The authentication server 200 transmits the matching result obtained at S34 to the terminal device 10.

At this time, in the authentication system 1, the feature information encrypted by the homomorphic encryption is transmitted to the calculation server 100, and the calculation server 100 does not have the secret key. Therefore, on the calculation server 100 side, it is difficult to know the feature information on the user. Furthermore, the authentication server 200 side receives the calculation result of the Hamming distance and performs decryption by using the secret key, so that it is difficult to know the feature information on the user. Therefore, unless the authentication server 200 having the secret key and the calculation server 100 collude with each other, it is possible to receive an authentication service while the feature information on the user is in a protected state (secured by encryption).

Figure 2:
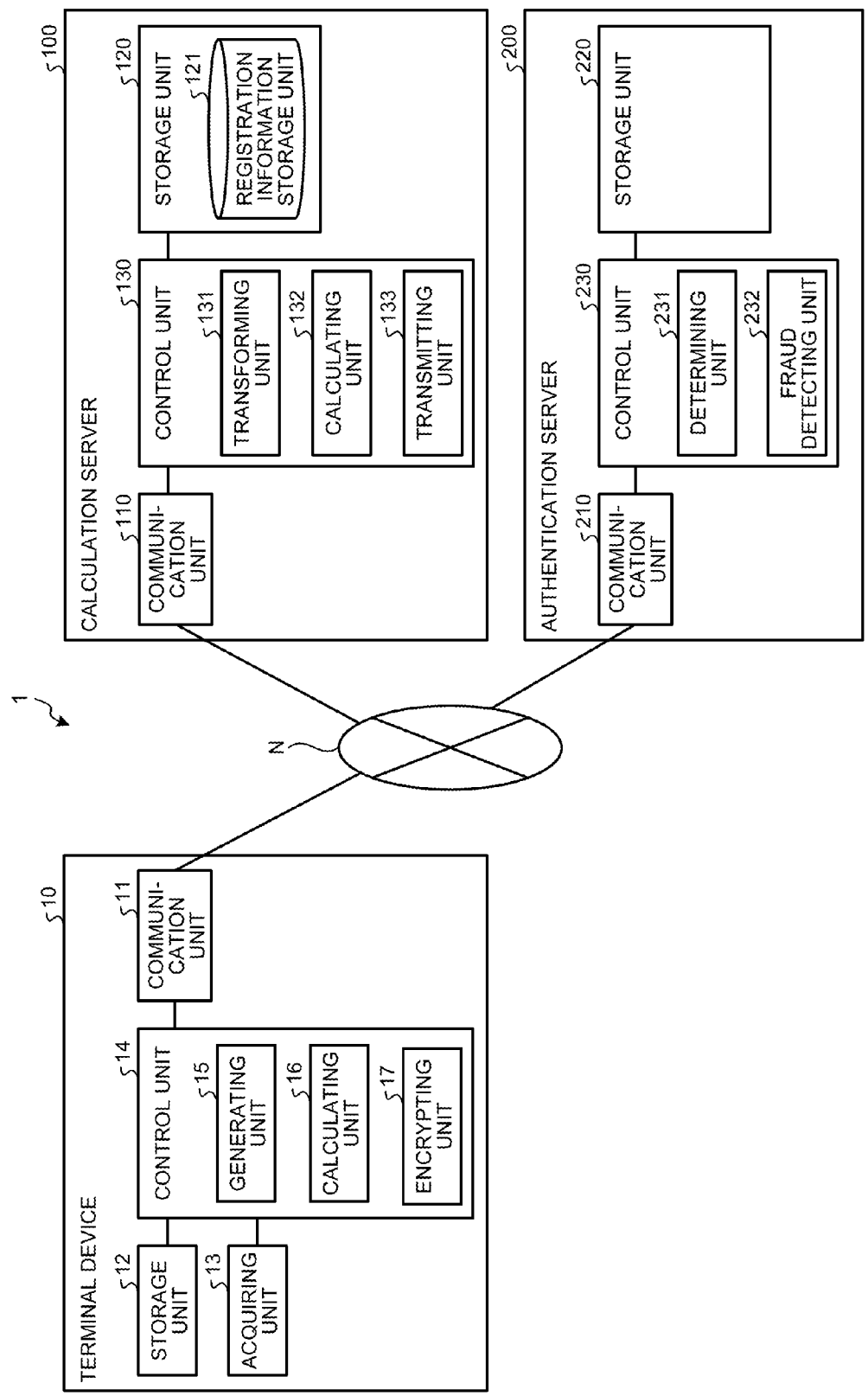
FIG. 2 is a block diagram illustrating an example of a configuration of the authentication system according to the embodiment.

FIG. 2 is a block diagram illustrating an example of a configuration of the authentication system 1 according to the embodiment. As illustrated in FIG. 2, the authentication system 1 includes the terminal device 10, the calculation server 100, and the authentication server 200, which are communicably connected to one another via a network N.

In the example in the figure, the authentication system 1 includes the single terminal device 10; however, the number of the terminal devices 10 is not limited and the authentication system 1 may include an arbitrary number of the terminal devices 10. Furthermore, as the network N, regardless of whether it is wired or wireless, arbitrary types of communication networks, such as the Internet, a local area network (LAN), or a virtual private network (VPN), may be employed.

The terminal device 10 includes a communication unit 11, a storage unit 12, an acquiring unit 13, and a control unit 14. Incidentally, the terminal device 10 may include various functional units included in a well-known computer, for example, functional units such as various input devices and voice output devices, in addition to the functional units illustrated in FIG. 2.

The communication unit 11 is implemented by, for example, a network interface card (NIC) or the like. The communication unit 11 is a communication interface that is connected to the calculation server 100 and the authentication server 200 by wire or wireless via the network N and controls communication of information with the calculation server 100 and the authentication server 200. The communication unit 11 transmits the data $E(pm_1(A))$, which is subjected to the homomorphic encryption and is input from the control unit 14, to the calculation server 100 when the feature information based on the biometric information on the user is registered. Furthermore, the communication unit 11 transmits the data $E(pm_2(B))$, which is subjected to the homomorphic encryption and is input from the control unit 14, to the calculation server 100 when the feature information based on the biometric information on the user is subjected to matching, and receives a matching result from the authentication server 200. The communication unit 11 outputs the received matching result to the control unit 14.

The storage unit 12 is implemented by, for example, a semiconductor memory element, such as a random access memory (RAM) or a flash memory, or a storage device, such as a hard disk or an optical disk. The storage unit 12 stores therein information used for a process performed by the control unit 14.

The acquiring unit 13 acquires the biometric information on the user. For example, the acquiring unit 13 captures an image of a fingerprint, a retina, an iris, a blood vessel, or the like by an imaging sensor or the like, and outputs image data of the captured image as the biometric information to the control unit 14. Incidentally, the biometric information to be acquired is not limited to the image data, and the acquiring unit 13 may acquire voice, handwriting, or the like as the biometric information.

The control unit 14 is implemented by, for example, executing a program stored in an internal storage device by a central processing unit (CPU), a micro processing unit (MPU), or the like by using a RAM as a work area. Furthermore, the control unit 14 may be implemented by an integrated circuit, such as an application specific integrated circuit (ASIC) or a field programmable gate array (FPGA). The control unit 14 includes a generating unit 15, a calculating unit 16, and an encrypting unit 17, and implements or executes functions and operations of information processing as described below. Incidentally, the internal configuration of the control unit 14 is not limited to the configuration illustrated in FIG. 2, and other configurations that perform the information processing as described below may be applied. Furthermore, upon input of the matching result from the communication unit 11, the control unit 14 performs a process according to the matching result. Moreover, the control unit 14 may perform a process of controlling whether to execute an encryption process by the encrypting unit 17 at the time of both registration and matching of the feature information, at the time of registration, or at the time of matching.

The generating unit 15, upon input of the biometric information on the user from the acquiring unit 13, extracts a feature from the biometric information and generates feature information. For example, in the case of a blood vessel image, the feature information may be information based on the degree of clogging (density) of a blood vessel, a color strength, or the like. For another example, in the case of a fingerprint image, the feature information may be information in which a branch point of the fingerprint or the like is extracted as a feature point. Incidentally, in the following description, the feature information may also be referred to as a feature vector. For example, the generating unit 15 determines a feature vector at the time of registration of the feature information as a feature vector A, determines a feature vector at the time of matching of the feature information as a feature vector B, and outputs the vectors to the calculating unit 16. The feature vector B is matching data (verification data) used for matching. Incidentally, the matching data is not limited to the feature vector, and any data used for matching with data registered by the user may be applied.

The calculating unit 16 calculates an ascending polynomial ($pm_1(A)$) or a descending polynomial ($pm_2(B)$) with respect to the feature vector A or B, and outputs a calculation result to the encrypting unit 17. Specifically, the ascending polynomial ($pm_1(A)$) is calculated with respect to the feature vector A at the time of registration. Furthermore, the descending polynomial ($pm_2(B)$) is calculated with respect to the feature vector B at the time of matching.

The encrypting unit 17 performs homomorphic encryption on $pm_1(A)$ or $pm_2(B)$, which is calculated by the calculating unit 16, by using an algorithm that enables a calculation of a Hamming distance (secure distance) in an encrypted state, for example, by using a public key for the homomorphic encryption. As the algorithm for performing encryption, for example, lattice-based encryption, such as Ideal lattices or Ring-Learning With Errors (LWE), may be used. As the public key for the homomorphic encryption, a public key distributed in advance from the authentication server 200 is used.

The encrypting unit 17 transmits data $E(pm_1(A))$ of $pm_1(A)$ subjected to the encryption to the calculation server 100 via the communication unit 11. Furthermore, the encrypting unit 17 transmits data $E(pm_2(B))$ of $pm_2(B)$ subjected to the encryption to the calculation server 100 via the communication unit 11.

The calculation server 100 includes a communication unit 110, a storage unit 120, and a control unit 130. Incidentally, the calculation server 100 may include various functional units included in a well-known computer, for example, functional units such as various input devices and voice output devices, in addition to the functional units illustrated in FIG. 2.

The communication unit 110 is implemented by, for example, a NIC or the like. The communication unit 110 is a communication interface that is connected to the terminal device 10 and the authentication server 200 by wire or wireless via the network N and controls communication of information with the terminal device 10 and the authentication server 200. The communication unit 110 receives the data $E(pm_1(A))$ or the data $E(pm_2(B))$ subjected to the homomorphic encryption from the terminal device 10. For example, the communication unit 110 receives the data $E(pm_1(A))$ at the time of registration of the feature information based on the biometric information on the user. Furthermore, for example, the communication unit 110 receives the data $E(pm_2(B))$ at the time of matching of the feature information based on the biometric information on the user. The communication unit 110 outputs the received data $E(pm_1(A))$ or the received data $E(pm_2(B))$ to the control unit 130. Furthermore, the communication unit 110, upon input of the calculation result of the Hamming distance from the control unit 130, transmits the calculation result to the authentication server 200.

The storage unit 120 is implemented by, for example, a semiconductor memory element, such as a RAM or a flash memory, or a storage device, such as a hard disk or an optical disk. The storage unit 120 includes a registered data storage unit 121. Furthermore, the storage unit 120 stores therein information used for a process performed by the control unit 130.

The registered data storage unit 121 stores therein the data $E(pm_1(A))$, which is the registered data on the user received from the terminal device 10 and is subjected to the homomorphic encryption, in association with a user identifier (ID) so as to enable identification of each user, for example.

The control unit 130 is implemented by, for example, executing a program stored in an internal storage device by a CPU, an MPU, or the like by using a RAM as a work area. Furthermore, the control unit 130 may be implemented by an integrated circuit, such as an ASIC or an FPGA. The control unit 130 includes a transforming unit 131, a calculating unit 132, and a transmitting unit 133, and implements or executes functions and operations of information processing as described below. Incidentally, the internal configuration of the control unit 130 is not limited to the configuration illustrated in FIG. 2, and other configurations that perform the information processing as described below may be applied.

The transforming unit 131 transforms the data $E(pm_1(A))$, which is the registered data on the user registered in the registered data storage unit 121, into data $E(pm_1(A'))$ such that a calculation result of a Hamming distance includes a Hamming distance between B and random vectors generated from A.

The transformation of the data $E(pm_1(A))$ performed by the transforming unit 131 will be described in detail below. In the following description, $E(pm_1(A))$ is simply described as E1(A), and $E(pm_2(B))$ is simply described as E2(B).

The transforming unit 131 transforms E1(A) as in Expression (1) below such that the Hamming distance between A and B, and the Hamming distance between B and random vectors generated from A appear in predetermined terms of a polynomial in a polynomial calculation for calculating the Hamming distance between E1(A) and E2(B).

$$E1(A) = E1(a_1, a_2, \ldots, a_d) \rightarrow E1(A') = E1(a_1, a_2, \ldots, a_d, a_1, a_2, \ldots, a_d) \quad (1)$$

E1(A') in Expression (1) is represented by addition of $E1(A) \cdot x_d$ to original data E1(A) as in Expression (2) below.

$$E1(A') = E1(A) \cdot x^d + E1(A) \quad (2)$$

When the inner product of E1(A') and E2(B) is calculated, a result as illustrated in Expression (3) below is obtained. Here, it is assumed that d=4 and n=8, for example.

$$E1(A') = E(a_1 + a_2 x + a_3 x^2 + a_4 x^3 + a_1 x^4 + a_2 x^5 + a_3 x^6 + a_4 x^7) \quad (3)$$

$$E2(B) = E(b_1 x^4 + b_2 x^3 + b_3 x^2 + b_4 x)$$

$$E1(A') \times E2(B) =$$

$$E((-a_4 b_4 - a_3 b_3 - a_2 b_2 - a_1 b_1) + (a_1 b_4 - a_4 b_3 - a_3 b_2 - a_2 b_1)x +$$

$$(a_2 b_4 + a_1 b_3 - a_4 b_2 - a_3 b_1)x^2 + (a_3 b_4 + a_2 b_3 + a_1 b_2 - a_4 b_1)$$

$$x^3 + (a_4 b_4 + a_3 b_3 + a_2 b_2 + a_1 b_1)x^4 +$$

$$(a_1 b_4 + a_4 b_3 + a_3 b_2 + a_2 b_1)x^5 +$$

$$(a_2 b_4 + a_1 b_3 + a_4 b_2 + a_3 b_1)x^6 + (a_3 b_4 + a_2 b_3 + a_1 b_2 + a_4 b_1)x^7)$$

As illustrated in Expression (3), the result of the inner product of A and B appears as a coefficient of $x_4$. Here, a process of rotating A i times is represented as $A_{<<i}$. For example, $A_{<<1}$ of A=$(a_1, a_2, a_3, a_4)$ is $A_{<<1}$=$(a_2, a_3, a_4, a_1)$. By using this notation, a result of a multiplication of E1(A') and E2(B) is arranged as in Expression (4) below.

$$E1(A') \times E2(B) = \quad (4)$$

$$E((-a_4 b_4 - a_3 b_3 - a_2 b_2 - a_1 b_1) + (a_1 b_4 - a_4 b_3 - a_3 b_2 - a_2 b_1)x +$$

$$(a_2 b_4 + a_1 b_3 - a_4 b_2 - a_3 b_1)x^2 + (a_3 b_4 + a_2 b_3 + a_1 b_2 - a_4 b_1)x^3 +$$

$$(A \times B)x^4 + (A_{<<1} \times B)x^5 + (A_{<<2} \times B)x^6 + (A_{<<3} \times B)x^7)$$

According to the result (Expression (4)), it is found that the results of the inner products of B and vectors obtained by rotating A to the left are stored in the coefficients of $x^5$, $x^6$, and $x^7$.

Furthermore, if a Hamming distance $D_H$ is calculated by using Expression (5) below, distances between the vectors obtained by rotating A to the left and B are obtained in the coefficients of $x^5$, $x^6$, and $x^7$. Incidentally, it is assumed that C=(1, 1, 1, 1) and C'=(1, 1, 1, 1, 1, 1, 1, 1).

$$E(D_H) = E1(A') \times E2(C) + E1(C') \times E2(B) - 2*E1(A') \times E2(B) \quad (5)$$

Here, it is examined that the distances between the vectors obtained by rotating A to the left and B are obtained in the coefficients of $x^5$, $x^6$, and $x^7$ by the calculation of the Hamming distance using Expression (5). Meanwhile, representation of encryption will be omitted.

First, E1(A')×E2(C) is obtained by Expression (6) below.

$$E1(A') \times E2(C) = E((-a_4 - a_3 - a_2 - a_1) + (a_1 - a_4 - a_3 - a_2)x + \quad (6)$$

$$(a_2 + a_1 - a_4 - a_3)x^2 + (a_3 + a_2 + a_1 - a_4)x^3 +$$

$$(a_4 + a_3 + a_2 + a_1)x^4 + (a_1 + a_4 + a_3 + a_2)x^5 +$$

$$(a_2 + a_1 + a_4 + a_3)x^6 + (a_3 + a_2 + a_1 + a_4)x^7)$$

$$= E((-a_4 - a_3 - a_2 - a_1) + (a_1 - a_4 - a_3 - a_2)x +$$

$$(a_2 + a_1 - a_4 - a_3)x^2 + (a_3 + a_2 + a_1 - a_4)x^3 +$$

$$\Sigma a_i x^4 + \Sigma a_i x^5 + \Sigma a_i x^6 + \Sigma a_i x^7)$$

Furthermore, E1(C')×E2(B) is obtained by Expression (7) below.

$$E1(C') \times E2(B) = E((-b_4 - b_3 - b_2 - b_1) + (b_4 - b_3 - b_2 - b_1)x + \quad (7)$$

$$(b_4 + b_3 - b_2 - b_1)x^2 + (b_4 + b_3 + b_2 - b_1)x^3 +$$

$$(b_4 + b_3 + b_2 + b_1)x^4 + (b_4 + b_3 + b_2 + b_1)x^5 +$$

$$(b_4 + b_3 + b_2 + b_1)x^6 + (b_4 + b_3 + b_2 + b_1)x^7)$$

$$= E((-b_4 - b_3 - b_2 - b_1) + (b_4 - b_3 - b_2 - b_1)x +$$

$$(b_4 + b_3 - b_2 - b_1)x^2 + (b_4 + b_3 + b_2 - b_1)x^3 +$$

$$\Sigma b_i x^4 + \Sigma b_i x^5 + \Sigma b_i x^6 + \Sigma b_i x^7)$$

According to the results of Expression (4), Expression (6), and Expression (7), $E(D_H)$ is obtained by Expression (8) below. Meanwhile, the Hamming distance between A and B is represented as D(A, B).

$$E(D_H) = E1(A') \times E2(C) + E1(C') \times E2(B) - 2E1(A') \times E2(B) = \quad (8)$$

$$E((-a_4 - a_3 - a_2 - a_1 - b_4 - b_3 - b_2 - b_1 - a_4 b_4 -$$

$$a_3 b_3 - a_2 b_2 - a_1 b_1) + (a_1 - a_4 - a_3 - a_2 + b_4 -$$

$$b_3 - b_2 - b_1 + a_1 b_4 - a_4 b_3 - a_3 b_2 - a_2 b_1)x +$$

$$(a_2 + a_1 + a_4 - a_3 + b_4 + b_3 - b_2 - b_1 + a_2 b_4 + a_1 b_3 -$$

$$a_4 b_2 - a_3 b_1)x^2 + (a_3 + a_2 + a_1 - a_4 + b_4 +$$

$$b_3 + b_2 - b_1 + a_3 b_4 + a_2 b_3 - a_1 b_2 - a_4 b_1)x^3 +$$

$$(\Sigma a_i + \Sigma b_i - 2A \times B)x^4 + (\Sigma a_i + \Sigma b_i - 2(A_{<<1} \times B))x^5 +$$

$$(\Sigma a_i + \Sigma b_i - 2(A_{<<2} \times B))x^6 + (\Sigma a_i + \Sigma b_i - 2(A_{<<3} \times B))x^7 =$$

$$E((-a_4 - a_3 - a_2 - a_1 - b_4 - b_3 - b_2 - b_1 - a_4 b_4 -$$

$$a_3 b_3 - a_2 b_2 - a_1 b_1) + (a_1 - a_4 - a_3 - a_2 + b_4 -$$

$$b_3 - b_2 - b_1 + a_1 b_4 - a_4 b_3 - a_3 b_2 - a_2 b_1)x +$$

$$(a_2 + a_1 + a_4 - a_3 + b_4 + b_3 - b_2 - b_1 + a_2 b_4 + a_1 b_3 -$$

-continued
$$a_4b_2 - a_3b_1)x^2 + (a_3 + a_2 + a_1 - a_4 + b_4 + b_3 + b_2 - b_1 + a_3b_4 + a_2b_3 - a_1b_2 - a_4b_1)x^3 + D(A, B)x^4 + D(A_{\ll 1}, B)x^5 + D(A_{\ll 2}, B)x^6 + D(A_{\ll 3}, B)x^7$$

As illustrated in Expression (8), the calculation result of the Hamming distance between A and B is obtained from a coefficient of $x^4$. Furthermore, the calculation results of the Hamming distances between the vectors obtained by rotating A to the left and B are obtained from the coefficients of $x^5$, $x^6$, and $x^7$.

The vectors obtained by rotating A to the left can be regarded as pieces of data on people different from A. Therefore, it is possible to assume that the Hamming distances between B and the pieces of data on people different from the user registered as A are stored in the coefficients of $x^5$, $x^6$, and $x^7$. As described above, the calculation result of the Hamming distance with respect to the data $E(pm_1(A'))$ transformed by the transforming unit 131 includes the Hamming distance between B and random vectors generated from A.

The calculating unit 132 calculates a Hamming distance (secure distance $E(D(A, B))$) between the data $E(pm_2(B))$, which is received from the terminal device 10 at the time of matching of the feature information based on the biometric information on the user, and the data $E(pm_1(A'))$, which is transformed by the transforming unit 131.

The transmitting unit 133 transmits the secure distance $E(D(A, B))$ calculated by the transforming unit 131 to the authentication server 200 via the communication unit 110.

The authentication server 200 includes a communication unit 210, a storage unit 220, and a control unit 230. Incidentally, the authentication server 200 may include various functional units included in a well-known computer, for example, functional units such as various input devices and voice output devices, in addition to the functional units illustrated in FIG. 2.

The communication unit 210 is implemented by, for example, a NIC or the like. The communication unit 210 is a communication interface that is connected to the terminal device 10 and the calculation server 100 by wire or wireless via the network N and controls communication of information with the terminal device 10 and the calculation server 100. The communication unit 210 receives the Hamming distance (secure distance $E(D(A, B))$) from the calculation server 100. The communication unit 210 outputs the received Hamming distance to the control unit 230. Furthermore, upon input of a matching result from the control unit 230, the communication unit 210 transmits the matching result to the terminal device 10.

The storage unit 220 is implemented by, for example, a semiconductor memory element, such as a RAM or a flash memory, or a storage device, such as a hard disk or an optical disk. The storage unit 220 stores therein information used for a process performed by the control unit 230.

The control unit 230 is implemented by, for example, executing a program stored in an internal storage device by a CPU, an MPU, or the like by using a RAM as a work area. Furthermore, the control unit 230 may be implemented by an integrated circuit, such as an ASIC or an FPGA. The control unit 230 includes a determining unit 231 and a fraud detecting unit 232, and implements or executes functions and operations of information processing as described below. Incidentally, the internal configuration of the control unit 230 is not limited to the configuration illustrated in FIG. 2, and other configurations that perform the information processing as described below may be applied. Furthermore, the control unit 230 manages a public key and a secret key for the homomorphic encryption, and distributes the public key to the terminal device 10 belonging to the authentication system 1 via the communication unit 210.

The determining unit 231 determines whether the Hamming distance (the secure distance $E(D(A, B))$) obtained from the secure distance received from the calculation server 100 is smaller than a threshold set in advance. Specifically, the determining unit 231, upon input of the secure distance from the communication unit 210, decrypts the input secure distance by the secret key for the homomorphic encryption. The determining unit 231 determines whether the Hamming distance in the decrypted plain text is smaller than the threshold.

Specifically, the determining unit 231 compares each of the Hamming distance between A and B, the Hamming distance between B and random vectors generated from A among the Hamming distances in plain text with the threshold set in advance. In the comparison, if the Hamming distance between A and B is equal to or greater than the threshold, the determining unit 231 determines that a matching result is NG, that is, determines that the authentication is not successful. Furthermore, if the Hamming distance between A and B, the determining unit 231 verifies whether B is the wolf used in the spoofing attack. When the Hamming distance between B and random vectors generated from A are also smaller than the threshold, the determining unit 231 determines that the matching result is reject due to spoofing performed by wolf. On the other hand, only when the Hamming distance between A and B is smaller than the threshold, the determining unit 231 determines that the matching result is OK.

The determining unit 231 determines, as the threshold, about 30% of a bit sequence of the Hamming distance. For example, when the Hamming distance is a 2048-bit sequence, about 680 bits may be employed. Furthermore, as to determination on whether the authentication is successful, it is determined whether (Hamming distance between B and random vectors generated from A)>2048−(threshold). If (Hamming distance between B and random vectors generated from A)>2048−(threshold), it may be determined that the authentication is successful (OK). The determining unit 231 transmits the contents of the determination as the matching result to the terminal device 10 via the communication unit 210.

The fraud detecting unit 232 detects whether the data $E(pm_2(B))$ transmitted at the time of matching is false (validity) based on the result of the determination by the determining unit 231. Specifically, if the determining unit 231 determines that the Hamming distance between B and random vectors generated from A are smaller than the threshold, the fraud detecting unit 232 determines that the information transmitted at the time of matching is false due to spoofing performed by wolf. The fraud detecting unit 232 outputs a detection result indicating false by display on a display device (not illustrated), such as a display, or by sending a notification to an address of an administrator set in advance.

In the spoofing attack by wolf, authentication is successfully performed with high probability with respect to not only the registered data on the user but also information on a person different from the user. Specifically, in the authentication by the data transmitted in the spoofing attack by wolf, the Hamming distance between A and wolf(B), and the Hamming distance between wolf (B) and feature vectors of other people (random vectors generated from A) are smaller than the threshold. Therefore, by detecting that the Hamming distance between A and B, and the Hamming distance between B and random vectors generated from A are smaller than the threshold, it is possible to easily detect the spoofing attack by wolf.

Figure 3:
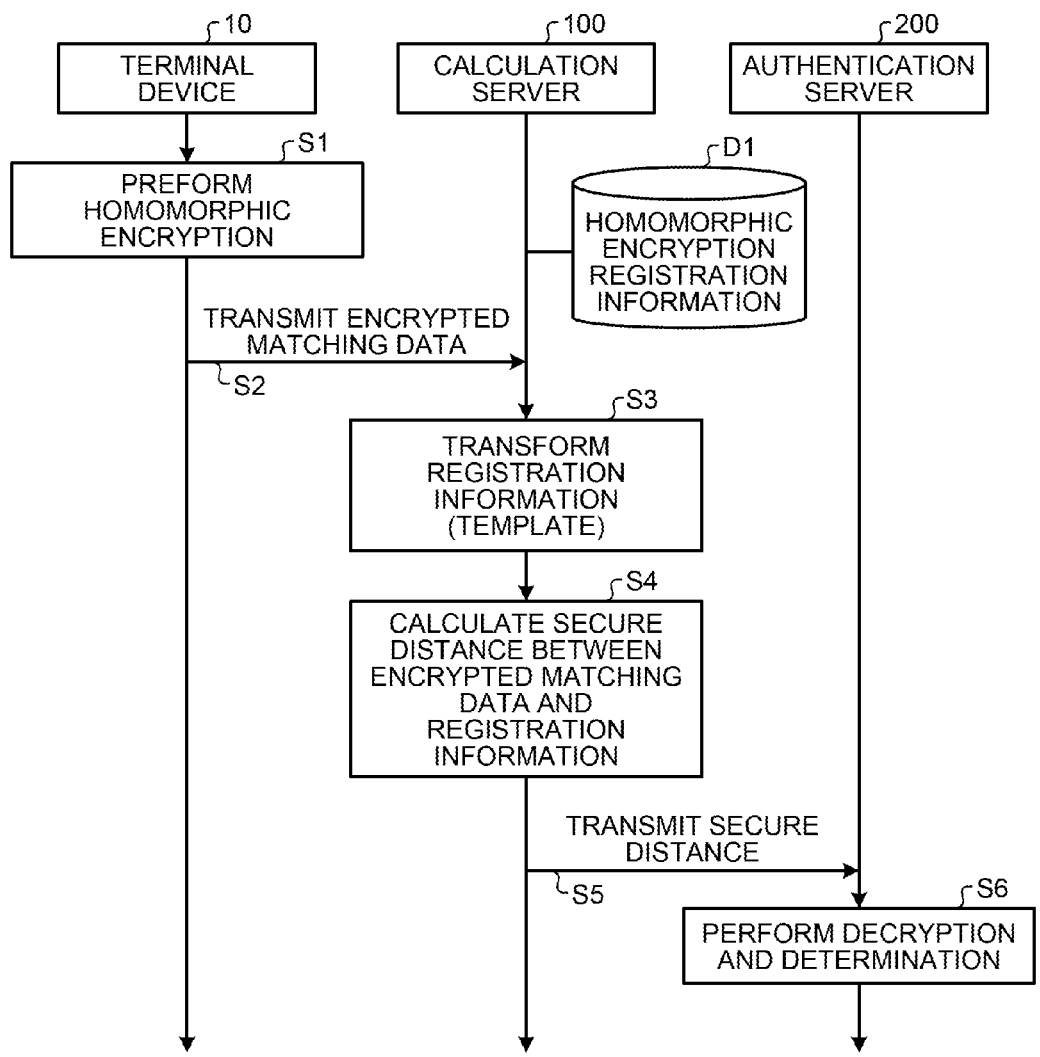
FIG. 3 is a ladder chart illustrating an example of operations performed by the authentication system according to the embodiment.

FIG. 3 is a ladder chart illustrating an example of operations performed by the authentication system 1 according to the embodiment, and in particular, a diagram illustrating operations for user authentication. As illustrated in FIG. 3, the terminal device 10 performs homomorphic encryption based on the acquired biometric information (S1), and transmits the encrypted matching data (data E(pm$_2$(B))) to the calculation server 100 (S2).

The calculation server 100 receives the encrypted matching data (data E(pm$_2$(B))). Subsequently, the transforming unit 131 reads, as the registered data on the user, registered data D1 (data E(pm$_1$(A))) subjected to the homomorphic encryption from the registered data storage unit 121, and performs data transformation (to the data E(pm$_1$(A'))) (S3).

Thereafter, the calculating unit 132 calculates a Hamming distance (secure distance E(D(A', B))) between the data (data E(pm$_1$(A'))) transformed by the transforming unit 131 and the encrypted matching data (the data E(pm$_2$(B))) (S4). Subsequently, the transmitting unit 133 transmits the secure distance E(D(A', B)) calculated by the calculating unit 132 to the authentication server 200 (S5).

The authentication server 200 receives the secure distance E(D(A', B)), and the determining unit 231 performs decryption/determination on the received secure distance by using the secret key for the homomorphic encryption (S6).

Figure 4:
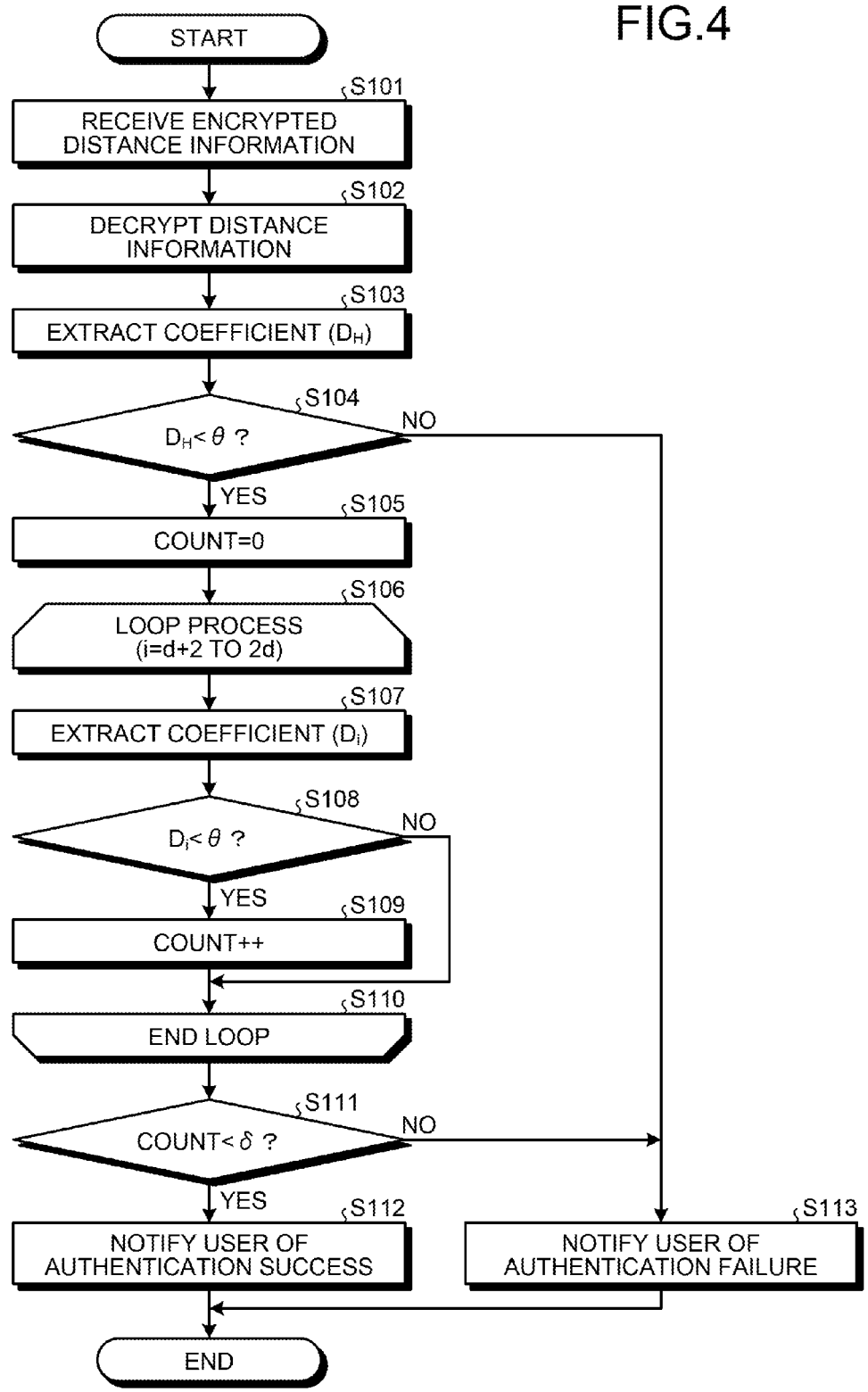
FIG. 4 is a flowchart illustrating an example of a decryption/determination process.

A decryption/determination process performed by the authentication server 200 will be described in detail below. FIG. 4 is a flowchart illustrating an example of the decryption/determination process.

As illustrated in FIG. 4, the control unit 230 receives the secure distance E(D(A', B)) from the calculation server 100 (S101), and decrypts distance information (Hamming distance) in plain text by using the secret key (S102). Subsequently, the determining unit 231 extracts a coefficient ($D_H$) of a term of D(A, B) from the decrypted distance information (S103). Specifically, the coefficient of $x^4$ in Expression (8) as described above is extracted.

Thereafter, the determining unit 231 determines whether $D_H$ is smaller than a threshold (θ) set in advance, that is, whether the Hamming distance between A and B is smaller than the threshold (S104). If $D_H$ is not smaller than the threshold (θ) set in advance (NO at S104), the determining unit 231 determines that a matching result is NG, and the process proceeds to S113.

If $D_H$ is smaller than the threshold (θ) set in advance (YES at S104), the determining unit 231 initializes a counter (Count) (Count=0) (S105). Subsequently, the determining unit 231 performs a loop process from i=d+2 to i=2d (S106 to S110) to sequentially extract Hamming distances between B and random vectors generated from A from the decrypted distance information, and counts the number of distances smaller than the threshold (θ).

Specifically, the determining unit 231 extracts coefficients ($D_i$) of items i from the decrypted distance information (S107). Specifically, the coefficients of $x^5$, $x^6$, and $x^7$ in Expression (8) as described above are extracted.

Subsequently, the determining unit 231 determines whether $D_i$ is smaller than the threshold (θ) set in advance, that is, whether the Hamming distance between B and random vector generated from A is smaller than the threshold (S108). If $D_i$ is not smaller than the threshold (θ) set in advance (NO at S108), the determining unit 231 does not count up the counter (Count), and the process proceeds to S110. If $D_1$ is smaller than the threshold (θ) set in advance (YES at S108), the determining unit 231 counts up the counter (Count), and the process proceeds to S110.

Subsequent to the loop process (S106 to S110), the determining unit 231 determines whether the counter (Count) is smaller than a set value (δ) set in advance (S111). The set value (δ) is set as "(false acceptance rate)×(number of dimensions)" in a memory in advance. If the number counted as the counter (Count) is smaller than the false acceptance rate (YES at S111), the determining unit 231 determines that a matching result is OK, and the process proceeds to S112. If the number counted as the counter (Count) exceeds the false acceptance rate (NO at S111), the determining unit 231 determines that the matching result is NG, and the process proceeds to S113.

In the spoofing attack by wolf, authentication is successfully performed with higher probability than the false acceptance rate with respect to registered data on other users. Therefore, when the authentication server 200 counts the number of determinations indicating that the Hamming distance between B and random vector generated from A is smaller than the threshold, the counted number exceeds the false acceptance rate in the case of the spoofing attack by wolf. Therefore, if determination is performed by counting the number of determinations indicating that the Hamming distance between B and random vector generated from A is smaller than the threshold, it is possible to accurately detect the spoofing attack by wolf.

At S112, the control unit 230 transmits an authentication success to the terminal device 10, and the terminal device 10 notifies the user of the authentication success. Furthermore, at S113, the control unit 230 transmits an authentication failure to the user, and the terminal device 10 notifies the user of the authentication failure. Therefore, even when the spoofing attack by wolf is performed, the authentication system 1 can notify the user of the authentication failure and avoid the attack.

As described above, in the authentication system 1, the transforming unit 131 transforms the encrypted registered data on the user, which is encrypted with an encryption algorithm that enables a calculation of a Hamming distance in an encrypted state, such that a calculation result of a Hamming distance includes a Hamming distance between A and B, and a Hamming distance between B and random vector generated from A. Furthermore, in the authentication system 1, the calculating unit 132 accepts input of the verification data and calculates a Hamming distance between the input verification data and the registered data transformed by the transforming unit 131. Moreover, in the authentication system 1, if the Hamming distance between A and B, and the Hamming distance between B and random vectors generated from A included in the calculated Hamming distance are within the threshold set in advance, the determining unit 231 determines that the input verification data is false.

Therefore, as to the verification data on authentication, the authentication system 1 can easily detect verification data that is falsely generated by an attacker to perform spoofing. Specifically, the registered data on the user is transformed such that a calculation result of a Hamming distance includes the Hamming distance between A and B, and the Hamming distance between B and random vectors generated from A, so that not only the Hamming distance between A and B but also the Hamming distance between B and random vectors generated from A can be obtained through a single calculation of the Hamming distance, and therefore, it is possible to reduce calculation costs. Furthermore, by providing a calculation result of the single calculation of the Hamming distance from the calculation server 100 to the authentication server 200, it is possible to provide the Hamming distance between B and random vectors generated from A in addition to the Hamming distance between A and B. Therefore, as compared to a case in which two calculation results on the user and a different person are provided, it is possible to suppress an increase in the communications traffic.

The components illustrated in the drawings need not necessarily be physically configured in the manner illustrated in the drawings. In other words, specific forms of distribution and integration of the components are not limited to those illustrated in the drawings, and all or part of the components may be functionally or physically distributed or integrated in arbitrary units depending on various loads or use conditions. For example, the transforming unit 131, the calculating unit 132, the transmitting unit 133 of the above-described embodiment may be integrated with each other.

Furthermore, for each processing function performed by each apparatus, all or any part of the processing function may be implemented by a CPU (or a microcomputer, such as an MPU or a micro controller unit (MCU)). Moreover, all or any part of each processing function may be implemented by a program analyzed and executed by the CPU (or a micro computer, such as an MPU or an MCU)) or may be realized by hardware using wired logic.

Figure 5:
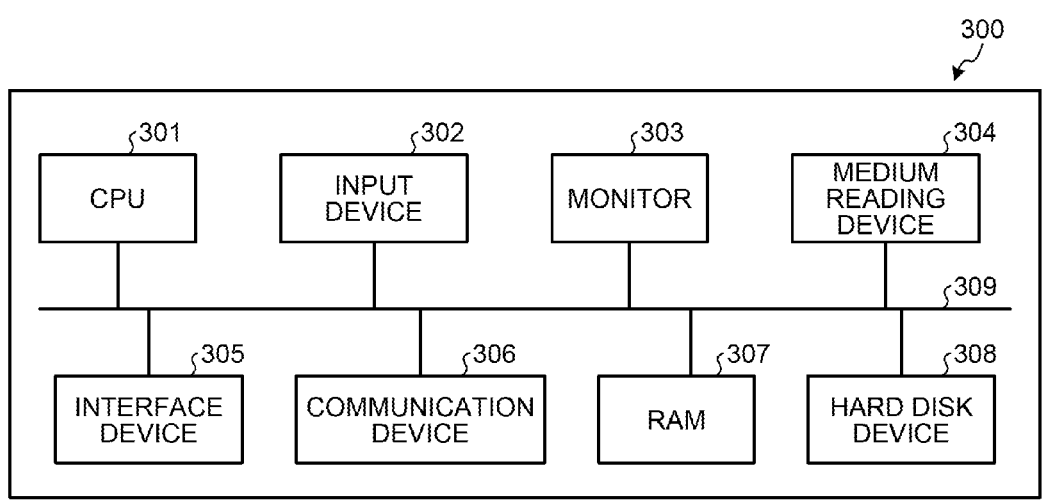
FIG. 5 is an explanatory diagram illustrating an example of a computer that executes an information processing program.

Incidentally, various processes explained in the above-described embodiment are realized by causing a computer to execute a program prepared in advance. Therefore, an example of the computer that executes a program with the same functions as those of the embodiment will be described below. FIG. 5 is a diagram illustrating an example of the computer that executes an information processing program.

As illustrated in FIG. 5, a computer 300 includes a CPU 301 that executes various arithmetic processing, an input device 302 that receives input of data, and a monitor 303. The computer 300 further includes a medium reading device 304 that reads a program and the like from a storage medium, an interface device 305 to connect to various apparatuses, and a communication apparatus 306 to connect to other information processing apparatuses by wire or wireless. The computer 300 further includes a RAM 307 for temporarily storing various types of information and a hard disk device 308. Each of the devices 301 to 308 are connected to a bus 309.

The hard disk device 308 stores therein an information processing program having the same functions as those of each of the processing units described in the embodiment. Furthermore, the hard disk device 308 stores therein various types of data to implement the information processing program. For example, the input device 302 accepts input of a password from a user or input of management information from an administrator of the computer 300. For example, the monitor 303 displays a password input screen for authentication or displays various types of information when the administrator of the computer 300 performs maintenance or the like. The interface device 305 is connected to a printing device, for example. The communication apparatus 306 is connected to the network N, for example.

The CPU 301 reads various programs stored in the hard disk device 308, loads the programs onto the RAM 307, and executes the programs to perform various processes. Furthermore, the programs can cause the computer 300 to function as each of the processing units described in the embodiment. Specifically, the computer can be caused to function in the same manner as the transforming unit 131, the calculating unit 132, and the transmitting unit 133 in the calculation server 100 or the determining unit 231 and the fraud detecting unit 232 in the authentication server 200.

The above-described information processing program need not necessarily be stored in the hard disk device 308. For example, the computer 300 may read and execute a program stored in a storage medium that the computer 300 can read. Examples of the storage medium that the computer 300 can read include a portable recording medium, such as a compact disc-ROM (CD-ROM), a digital versatile disk (DVD), and a universal serial bus (USB) memory, a semiconductor memory, such as a flash memory, and a hard disk drive. Furthermore, it may be possible to store the information processing program in an apparatus connected to a public line, the Internet, a LAN, or the like, and cause the computer 300 to read and execute the information processing program.

According to an embodiment of the present invention, it is possible to easily detect false verification data.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing method comprising:
   transforming registered data on a user, which is encrypted with an encryption algorithm that enables a calculation of a Hamming distance in an encrypted state, such that a calculation result of a Hamming distance between the transformed registered data and verification data that is encrypted with the encryption algorithm includes a Hamming distance between the verification data and the registered data and Hamming distances between the verification data and each of random vectors generated from the registered data, using a processor;
   calculating Hamming distances between the verification data that is input and the transformed registered data, using the processor; and
   determining whether the input verification data is false based on a result of comparison of each of the Hamming distance between the verification data and the registered data and the Hamming distances between the verification data and each of the random vectors generated from the registered data included in the calculated Hamming distances with a threshold set in advance, using the processor.

2. The information processing method according to claim 1, wherein the determining includes determining that the input verification data is false when number of Hamming distances within the threshold exceeds a predetermined value among the Hamming distances between the verification data and each of the random vectors generated from the registered data.

3. The information processing method according to claim 1, wherein the transforming includes transforming the registered data by adding a new element to original registered data such that, in a calculation result of a Hamming distance based on a calculation of a polynomial of elements contained in the registered data and elements contained in the verification data, the Hamming distance between the verification data and the registered data and the Hamming distance between the verification data and random vectors generated from the registered data appear in predetermined items of the polynomial.

4. A non-transitory computer-readable recording medium having stored therein a program that causes a computer to execute a process comprising:
  transforming registered data on a user, which is encrypted with an encryption algorithm that enables a calculation of a Hamming distance in an encrypted state, such that a calculation result of a Hamming distance between the transformed registered data and verification data that is encrypted with the encryption algorithm includes a Hamming distance between the verification data and the registered data and Hamming distances between the verification data and each of a random vector generated from the registered data;
  calculating Hamming distances between the verification data that is input and the transformed registered data; and
  determining whether the input verification data is false based on a result of comparison of each of the Hamming distance between the verification data and the registered data and the Hamming distances between the verification data and each of the random vector generated from the registered data included in the calculated Hamming distances with a threshold set in advance.

5. The non-transitory computer-readable recording medium according to claim 4, wherein the determining includes determining that the input verification data is false when number of Hamming distances within the threshold exceeds a predetermined value among the Hamming distances between the verification data and each of the random vectors generated from the registered data.

6. The non-transitory computer-readable recording medium according to claim 4, wherein the transforming includes transforming the registered data by adding a new element to original registered data such that, in a calculation result of a Hamming distance based on a calculation of a polynomial of elements contained in the registered data and elements contained in the verification data, the Hamming distance between the verification data and the registered data and the Hamming distance between the verification data and random vectors generated from the registered data appear in predetermined items of the polynomial.

7. An information processing apparatus comprising a processor that executes a process comprising:
  transforming registered data on a user, which is encrypted with an encryption algorithm that enables a calculation of a Hamming distance in an encrypted state, such that a calculation result of a Hamming distance between the transformed registered data and verification data that is encrypted with the encryption algorithm includes a Hamming distance between the verification data and the registered data and Hamming distances between the verification data and each of random vector generated from the registered data;
  calculating Hamming distances between the verification data that is input and the transformed registered data; and
  determining whether the input verification data is false based on a result of comparison of each of the Hamming distance between the verification data and the registered data and the Hamming distances between the verification data and each of the random vectors generated from the registered data included in the calculated Hamming distances with a threshold set in advance.

8. The information processing apparatus according to claim 7, wherein the determining includes determining that the input verification data is false when number of Hamming distances within the threshold exceeds a predetermined value among the Hamming distances between the verification data and each of the random vectors generated from the registered data.

9. The information processing apparatus according to claim 7, wherein the transforming includes transforming the registered data by adding a new element to original registered data such that, in a calculation result of a Hamming distance based on a calculation of a polynomial of elements contained in the registered data and elements contained in the verification data, the Hamming distance between the verification data and the registered data and the Hamming distance between the verification data and random vectors generated from the registered data appear in predetermined items of the polynomial.

* * * * *